United States Patent
Kim

(12)
(10) Patent No.: US 6,173,398 B1
(45) Date of Patent: Jan. 9, 2001

(54) COMPUTER SYSTEM USING A COMMON BIOS FOR OPERATING PLURALITY OF EXPANSION ADAPTERS

(75) Inventor: Hee-Jo Kim, Seoul (KR)

(73) Assignee: SamSung Electronics Co., Ltd., Kyungki-do (KR)

( * ) Notice: Under 35 U.S.C. 154(b), the term of this patent shall be extended for 0 days.

(21) Appl. No.: 09/075,319

(22) Filed: May 11, 1998

(30) Foreign Application Priority Data

May 28, 1997 (KR) .................................................. 97-21309

(51) Int. Cl.[7] .............................. G06F 15/177; G06F 9/00; G06F 9/24; G06F 9/445
(52) U.S. Cl. ..................... 713/2; 713/1; 710/8; 710/104; 714/3; 714/36
(58) Field of Search ................................ 713/2, 1; 710/8, 710/104; 714/3, 36

(56) References Cited

U.S. PATENT DOCUMENTS

| | | | |
|---|---|---|---|
| 4,556,953 | 12/1985 | Caprio et al. | 364/900 |
| 4,589,063 | 5/1986 | Shah et al. | 364/200 |
| 5,077,683 | 12/1991 | Aydin . | |
| 5,109,517 | 4/1992 | Houda et al. | 395/800 |
| 5,210,875 | 5/1993 | Bealkowski et al. . | |
| 5,237,690 | 8/1993 | Bealkowski et al. | 395/700 |
| 5,257,387 | 10/1993 | Richek et al. | 395/800 |
| 5,299,322 | 3/1994 | Arai et al. . | |
| 5,327,549 | 7/1994 | Nissimov et al. . | |
| 5,355,489 | 10/1994 | Bealkowski et al. | 395/700 |
| 5,367,640 | 11/1994 | Hamilton et al. | 395/275 |
| 5,473,775 | 12/1995 | Sakai et al. . | |
| 5,530,887 | 6/1996 | Harper et al. | 395/800 |
| 5,548,587 | 8/1996 | Bailey et al. | 370/60.1 |
| 5,680,556 | 10/1997 | Begun et al. . | |
| 5,689,726 | 11/1997 | Lin | 395/830 |

*Primary Examiner*—Robert W. Beausoliel, Jr.
*Assistant Examiner*—Robert G. Crockett
(74) *Attorney, Agent, or Firm*—Robert E. Bushnell, Esq.

(57) ABSTRACT

A computer system using a common Basic input/output system for operation with different expansion adapters which comprises a setting block for setting information of whether expansion adapters are mounted in an expansion block, and a controller for determining whether the expansion adapters are set in the expansion block through signals from the setting block in order to disable execution of a Basic input/output system routine of the expansion adapter which is not set, and enable execution of the Basic input/output system routine related to the expansion adapter which is set.

8 Claims, 7 Drawing Sheets

COMPUTER SYSTEM USING A COMMON BIOS FOR OPERATING PLURALITY OF EXPANSION ADAPTERS

CLAIM FOR PRIORITY

This application makes reference to, incorporates the same herein, and claims all benefits accruing under 35 U.S.C. §119 from an application for A COMPUTER FOR USING A COMMON BIOS AND A CONTROL METHOD THEREOF earlier filed in the Korean Industrial Property Office on May 28, 1997, and there duly assigned Serial No. 21309/1997, a copy of which application is annexed hereto.

BACKGROUND OF THE INVENTION

1. Technical Field

The present invention relates to a computer system using a common BIOS (Basic Input Output System) for operation with a variety of expansion adapters, and more particularly, relates to a computer system using a common BIOS for performing a POST (Post On Self Test) during booting after determining whether various expansion adapters are mounted in corresponding expansion slots of the computer system.

2. Related Art

Contemporary computer systems generally consist of a main unit (which may have built-in storage devices such as floppy disks, hard disks and CD-ROM), a keyboard and a video monitor. The main unit is constructed with a motherboard that includes primary digital electronics electrically connected to a common system bus for processing necessary functions of the computer. Data devices including an internal audio card, a network card, a fax/modem card, and a small computer system interface (SCSI) card may be connected to the common system bus by way of corresponding expansion adapters mounted on the motherboard of the computer. A typical expansion adapter is described, for example, in U.S. Pat. No. 5,077,683 for Expansion Slot Adapter With Embedded Data Device Interface issued to Aydin.

Data is transferred between the computer and the data devices in accordance with the interface standard under the control of the basis input/output system (BIOS) of the computer. The BIOS allows new data devices to be added to the computer for communication while insulating the application program from the peculiarities of the hardware. The BIOS is used to free a device driver from depending on specific hardware characteristics while providing the device driver with an intermediate interface to the device. Examples of contemporary computer systems using a BIOS for booting purposes are disclosed in U.S. Pat. No. 5,210,875 for Initial BIOS Load For A Personal Computer System issued to Bealkowski et al., U.S. Pat. No. 5,299,322 for Computer System With Improved Interface Control Of An I/O Expansion Unit issued to Arai et al., U.S. Pat. No. 5,327,549 for Data Storage System Including A BIOS Extension Memory On An Adapter Between A Host Computer And Disk Drive issued to Nissimov et al., U.S. Pat. No. 5,473,775 for Personal Computer Using Flash Memory As BIOS-ROM issued to Sakai et al., U.S. Pat. No. 5,680,556 for Computer System And Method Of Operation Thereof Wherein A BIOS ROM Can Be Selectively Locatable On Different Buses issued to Begun et al.

Generally, when any data device is removed from the expansion adapter function block in the motherboard, the software portion corresponding to the data device is deleted or skipped, in which a BIOS routine of a new version is used. Since the expansion adapters are optional, some motherboards may contain an internal audio adapter, a network adapter and a fax/modem adapter while others include only the internal audio adapter. Additional BIOS routine from a flash ROM of the motherboard may be used for each situation. That is, the modem portion is deleted or skipped when the modem adapter is not mounted in the expansion adapter function block. BIOS has to be updated and expanded to include new hardware or contracted to delete old hardware.

Since the technology is rapidly changing and new hardware is being added to the computer systems, modification to the BIOS has become a significant problem of inconvenience and cost. BIOS program of a new version must be used each time. User must distinguish the BIOS program of an appropriate version from many other versions for upgrading purposes each time an additional adapter is added to the motherboard. If each BIOS program of a corresponding adapter in the motherboard is not properly loaded and correctly managed, the computer system may not operate properly.

SUMMARY OF THE INVENTION

Accordingly, it is therefore an object of the present invention to provide a computer system using a common BIOS (Basic Input Output System) for operation with a variety of expansion adapters.

It is also an object to provide a computer system using a common BIOS for performing a POST (Post On Self Test) during booting after determining whether various expansion adapters are mounted in a motherboard of the computer system.

These and other objects of the present invention can be achieved by a computer system using a common BIOS for operation with expansion adapters which comprises a setting block for setting information of whether expansion adapters are mounted in an expansion adapter function block; and a controller for sensing whether the expansion adapters are set through a signal communication from the setting block in order to disable execution of a BIOS routine of the expansion adapter which is not set, and enable execution of a BIOS routine related to the expansion adapter which is set.

According to another aspect of the present invention, a method of using a common BIOS program including a plurality of BIOS routines for operation with expansion adapters in a computer system includes the steps of: determining which expansion adapters are mounted in the computer system; and enabling the BIOS routines for the expansion adapters which are mounted in the computer system, and disabling the BIOS routines for the expansion adapters which are not mounted in the computer system.

According to another aspect of the present invention a computer system comprises a flash ROM storing an internal BIOS and control program, an expansion adapter function block for connecting various expansion adapters, a setting block for setting corresponding information after determining that expansion adapters are mounted in the expansion adapter function block and generating corresponding signals according to whether each expansion adapter is mounted in the expansion adapter function block, a core chipset for receiving or outputting data from or to the flash ROM and the expansion adapter function block through a system bus, and a central processing unit (CPU) for determining whether various expansion adapters are set in the expansion adapter function block through the core chipset in order to disable the BIOS routine of the adapter which is not set, and enable a BIOS routine related to the set expansion adapter.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 6:
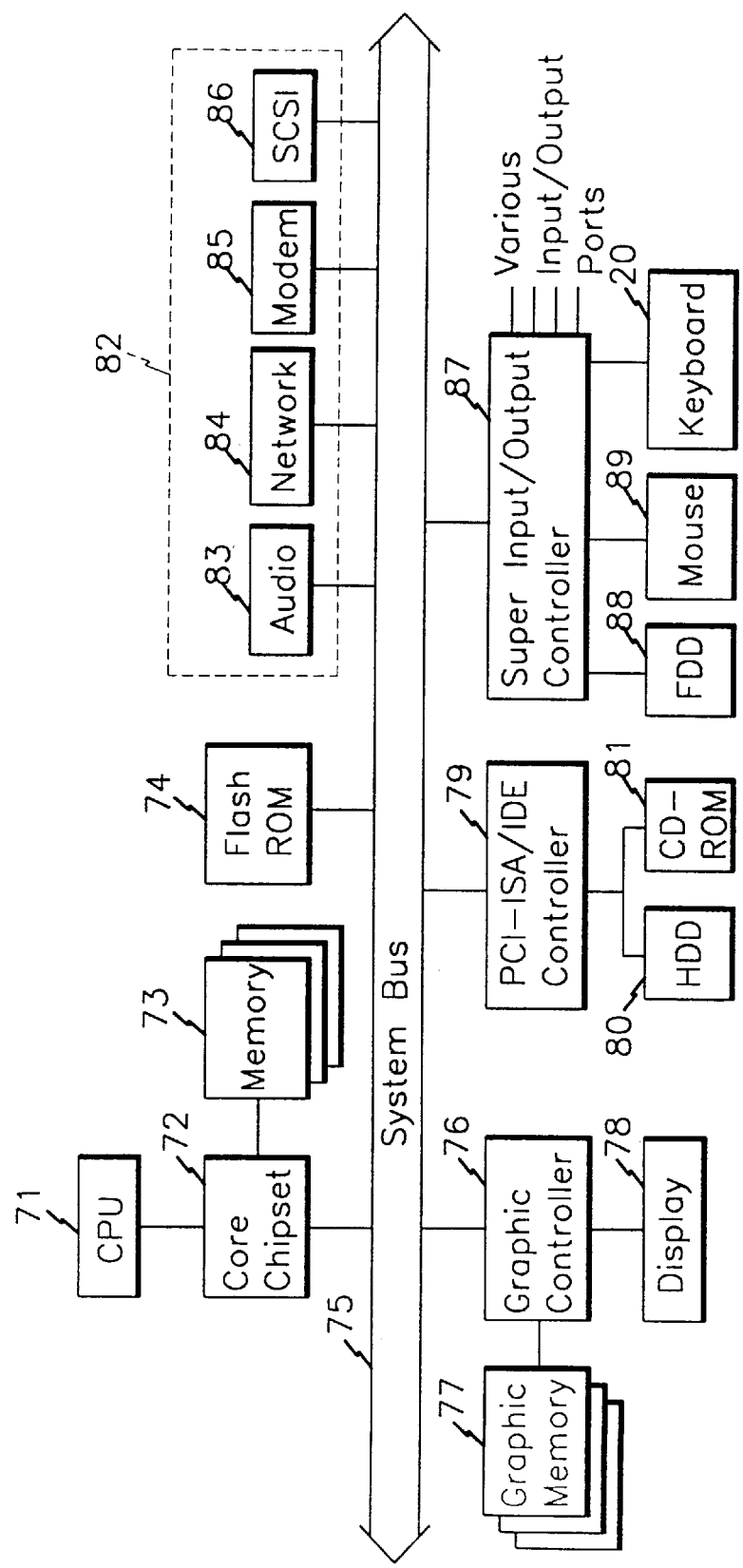
FIG. 6 is a block diagram of a typical computer system.

Referring now to the drawings and particularly to FIG. 6, which illustrates a typical computer system with expansion adapters. As shown in FIG. 6, the computer system includes a keyboard 20, a central processing unit (CPU) 71, a core chipset 72, a memory 73, a flash ROM 74 for storing an internal BIOS program, a system bus 75, a graphic controller 76, a graphic memory 77, a display 78, a PCI-ISA/IDE controller 79, a hard disk drive (HDD) 80, a compact disk read1 only-memory (CD-ROM) 81, an expansion adapter function block 82 including an audio adapter 83, a network adapter 84, a modem adapter 85, a small computer system interface (SCSI) 86, a super input/output controller 87, a floppy disk drive (FDD) 88, and a mouse 89.

The system bus 75, which is an input/output interface applied to a micro-processor, for connecting data, command, and interrupt in the computer system to each circuit block or each device. The CPU 71 is connected to the system bus I for controlling the computer system. The display 78 provides visual display of information data on a screen. The core chipset 72 is connected to the system bus 75. The memory 73 is connected to the core chipset 72 and serves as a memory area where the CPU 71 stores a system software and a user software.

The super input/output controller 87 is connected to the system bus 75 for controlling the input or output from the keyboard 20, the mouse 89 and the FDD 88. The IDE controller 79 is connected to the HDD 80 and the CD-ROM 81 via the system bus 75 for controlling the input or output of the HDD 80 and the CD-ROM 81. The expansion adapter function block 82 supports the audio adapter 83, the network adapter 84, the modem adapter 85 and the SCSI adapter 86 for function expansions in the computer system. The graphic memory 77 is connected to the graphic controller 76 for storing data to be displayed on the display 78.

Figure 7:
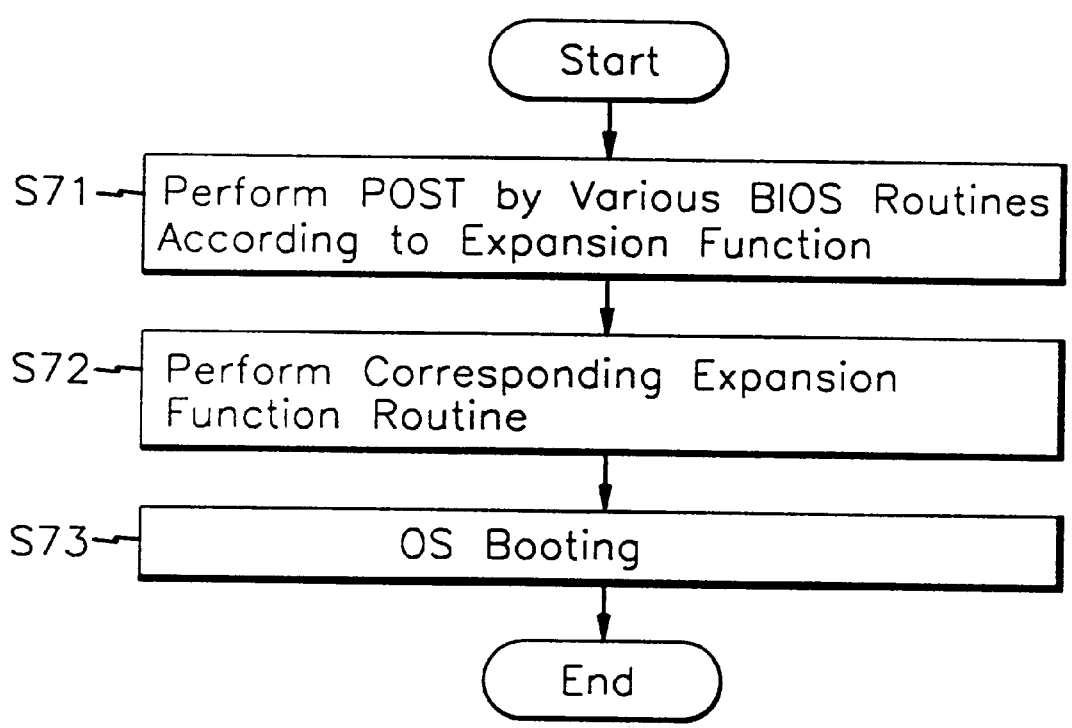
FIG. 7 is a flow chart of a typical BIOS executive routine for use in the computer system.

When power is applied to the computer system, the BIOS program in the flash ROM 74 is read to the first memory 73 through the core chipset 72, and the CPU 71 enables the BIOS routine as shown in FIG. 7. First, the CPU 71 performs a POST procedure by various BIOS routines according to the expansion function at step 71. Then the CPU 71 performs corresponding expansion function routine at step 72, and performs an OS booting sequence at step 73.

Generally, when any data device such as an audio adapter 83, a network adapter 84, a modem adapter 85 and a SCSI adapter 86 is removed from the expansion adapter function block 82 in the motherboard, the BIOS portion corresponding to the data device is deleted or skipped, and a BIOS routine of a new version is used. Since the expansion adapters are optional, some motherboards may contain an internal audio adapter 83, a network adapter 84 and a modem adapter 85 while others include only the internal audio adapter 83. Additional BIOS routine from a flash ROM of the motherboard may be used for each situation. That is, the modem portion is deleted or skipped when the modem adapter is not mounted in the expansion adapter function block. BIOS has to be updated and expanded to include new hardware or contracted to delete old hardware.

Since the technology is rapidly changing and new hardware is being added to the computer systems, modification to the BIOS has become a significant problem of inconvenience and cost. BIOS program of a new version must be used each time. User must distinguish the BIOS program of an appropriate version from many other versions for upgrading purposes each time an additional adapter is added to the motherboard. If each BIOS program of a corresponding adapter in the motherboard is not properly loaded and correctly managed, the computer system may not operate properly.

Figure 1:
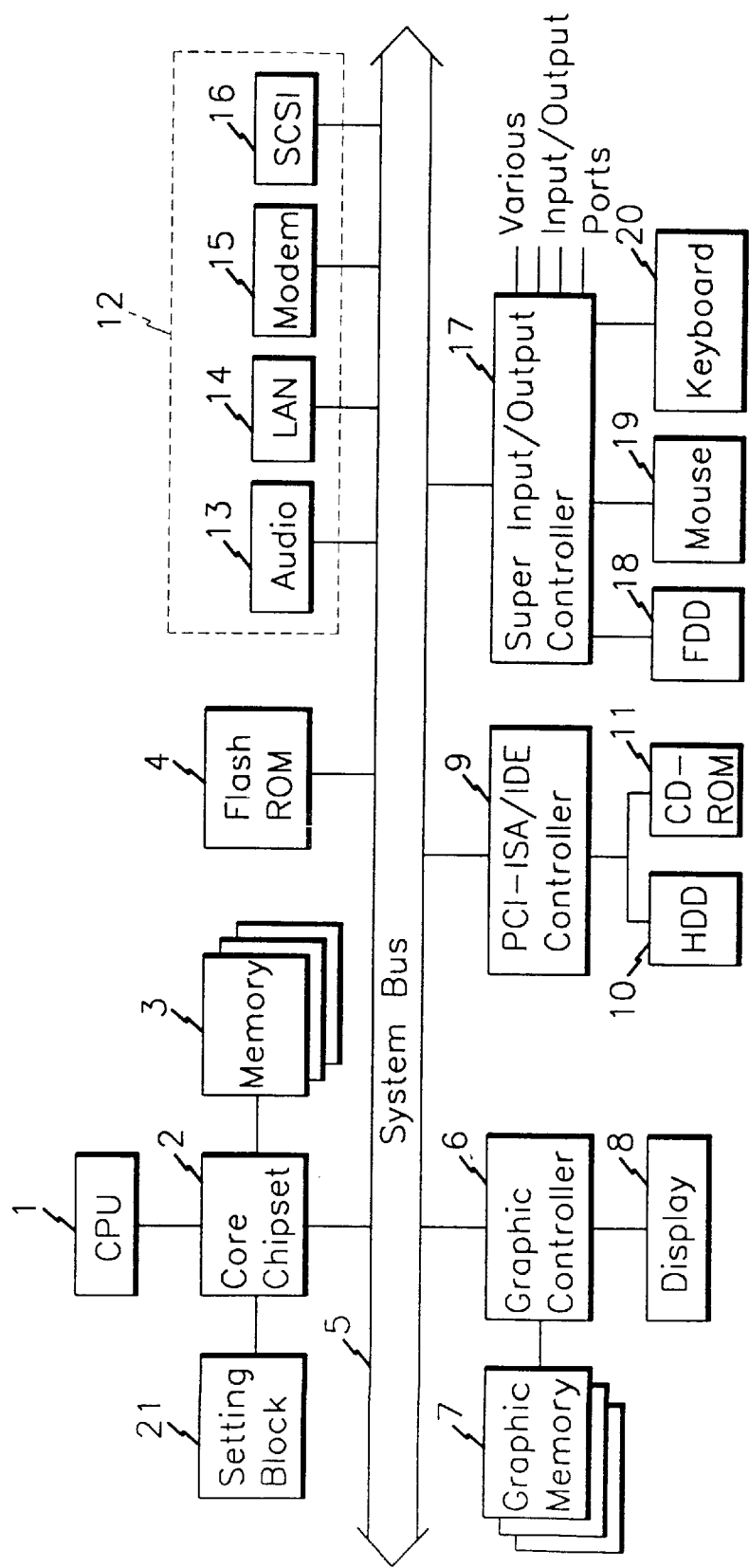
FIG. 1 is a block diagram of a computer system using a common BIOS according to a preferred embodiment of the present invention.

Refer now to FIG. 1, which illustrates a computer system for using a common BIOS according to a preferred embodiment of the present invention. The computer system includes a flash ROM 4 for storing an internal BIOS and control program, an expansion adapter function block 12 for connecting an audio adapter 13, a LAN adapter 14, a modem adapter 15 and a SCSI adapter 16. A setting block 21 is connected to a core chipset 2 for setting corresponding information after determining that expansion adapters 13 to 16 are mounted in the expansion adapter function block 82 and generating corresponding signals GPI1 to GPI4 according to whether each expansion adapter is mounted in the expansion adapter function block 82. A memory 3 is connected to the core chipset 2 and serves a temporary memory for the CPU 1.

A graphic controller 6 is connected to a system bus 5 for controlling operation of the display 8 and the graphic memory 7. A PCI-ISA/IDE (Industry Device Electronics) controller 9 is connected to the system bus 5 for controlling a hard disk drive (HDD) 10 and a CD-ROM 11. A super input/output controller 17 is also connected to the system bus 5 for controlling a floppy disk drive FDD 18, a keyboard 19, a mouse 20 and various input/output ports. The core chipset 2 receives and in turn generates data from or to the flash ROM 4, the memory 3, the graphic controller 6, the PCI-ISA/IDE controller 9, the super input/output controller 17 and the expansion adapter function block 12 through the system bus 5, and then senses when the expansion adapters 13 to 16 are mounted in the expansion adapter function block 12 via corresponding signals GPI1 to GP14.

The CPU 1 determines whether various expansion adapters 13 to 16 are mounted in the expansion adapter function block 12 through the core chipset 2, disables the BIOS routine of the expansion adapter which is not set, and enables BIOS routine related to the set expansion adapter.

Figure 2:
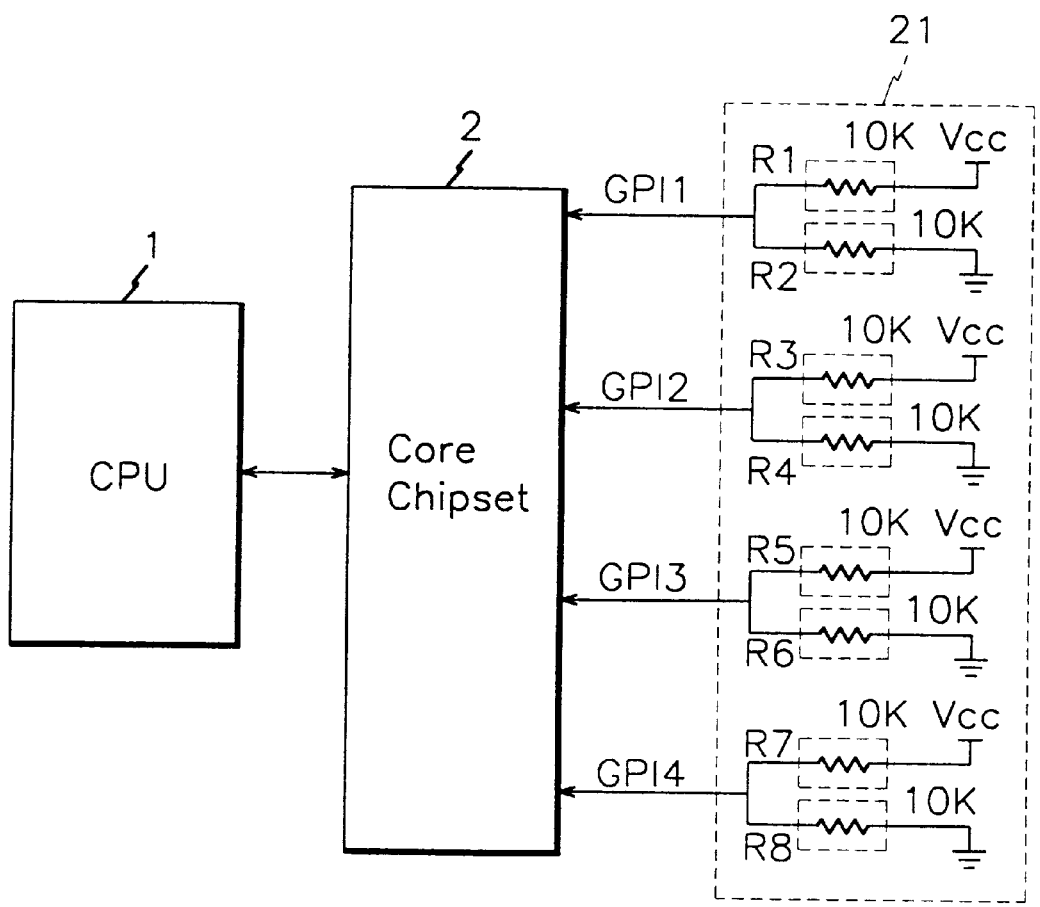
FIG. 2 illustrates a setting block of the computer system using a common BIOS according to a first embodiment of the present invention.

FIG. 2 illustrates a setting block of the computer system using a common BIOS according to a preferred embodiment of the present invention. The setting block 21 is used in combination with the core chipset 2 and the CPU 1 for setting corresponding information after determining that expansion adapters 13 to 16 are mounted in the expansion adapter function block 12 and outputting corresponding signals GPI1 to GPI4. The core chipset 2 senses the corresponding signals GPI1 to GPI4 from the setting block 21 for the CPU 1 to determine whether various expansion adapters 13 to 16 are mounted in the expansion adapter function block 12 in order to either disable the BIOS routine of the adapter which is not set, and enable the BIOS routine related to the set expansion adapter.

As shown in FIG. 2, the setting block 21 is comprised of a series of pull-up and pull-down resistors R1 to R8 connected in parallel with each resistor exhibiting a resistance value of 10K. The setting block 21 sets the corresponding information using pull-up resistors R1, R3, R5 and R7 and pull-down resistors R2, R4, R6 and R8 after determining that expansion adapters 13 to 16 are mounted in the expansion adapter function block 12. The setting block 21 outputs corresponding general purpose input (GPI) signals each exhibiting a high level to inform the core chipset 2 that the expansion adapters 13 to 16 set by the pull-up resistors R1, R3, R5 and R7 are mounted in the expansion adapter function block 12 when the pull-up resistors R1, R3, R5 and R7 are connected to the core chipset 2. The setting block 21 outputs corresponding general purpose input (GPI) signals each exhibiting a low level to inform the core chipset 2 that the expansion adapters 13 to 16 set by the pull-down resistors R1, R3, R5 and R7 are not mounted in the expansion adapter function block 12 when the pull-down resistors R2, R4, R6 and R8 are connected to the core chipset 2.

In addition, the core chipset 2 is connected to either a first resistor R1 having one terminal connected to Vcc for receiving a first general purpose input signal GPI1 of a high level informing that the audio adapter 13 is mounted in the expansion adapter function block 12, or a second resistor R2 having one terminal grounded for receiving the first general purpose input signal GPI1 of a low level informing that the audio adapter 13 is not mounted in the expansion adapter function block 12 in the setting block 21.

The core chipset 2 is connected to either a third resistor R3 having one terminal connected to Vcc for receiving a second general purpose input signal GPI2 of a high level informing that the LAN adapter 14 is mounted in the expansion adapter function block 12, or a fourth resistor R4 having one terminal grounded for receiving the second general purpose input signal GP12 of a low level informing that the LAN adapter 14 is not mounted in the expansion adapter function block 12 in the setting block 21.

The core chipset 2 is connected to either a fifth resistor R5 having one terminal connected to Vcc for receiving a third general purpose input signal GPI3 of a high level informing that the modem adapter 15 is mounted in the expansion adapter function block 12, or a sixth resistor R6 having one terminal grounded for receiving the third general purpose input signal GPI3 of a low level informing that the modem adapter 15 is not mounted in the expansion adapter function block 12 in the setting block 21.

The core chipset 2 is connected to either a seventh resistor R7 having one terminal connected to Vcc for receiving a fourth general purpose input signal GPI4 of a high level informing that the SCSI adapter 16 is mounted in the expansion adapter function block 12, or an eighth resistor R8 having one terminal grounded for receiving the fourth general purpose input signal GPI4 of a low level informing that the SCSI adapter 16 is not mounted in the expansion adapter function block 12 in the setting block 21.

Figure 3:
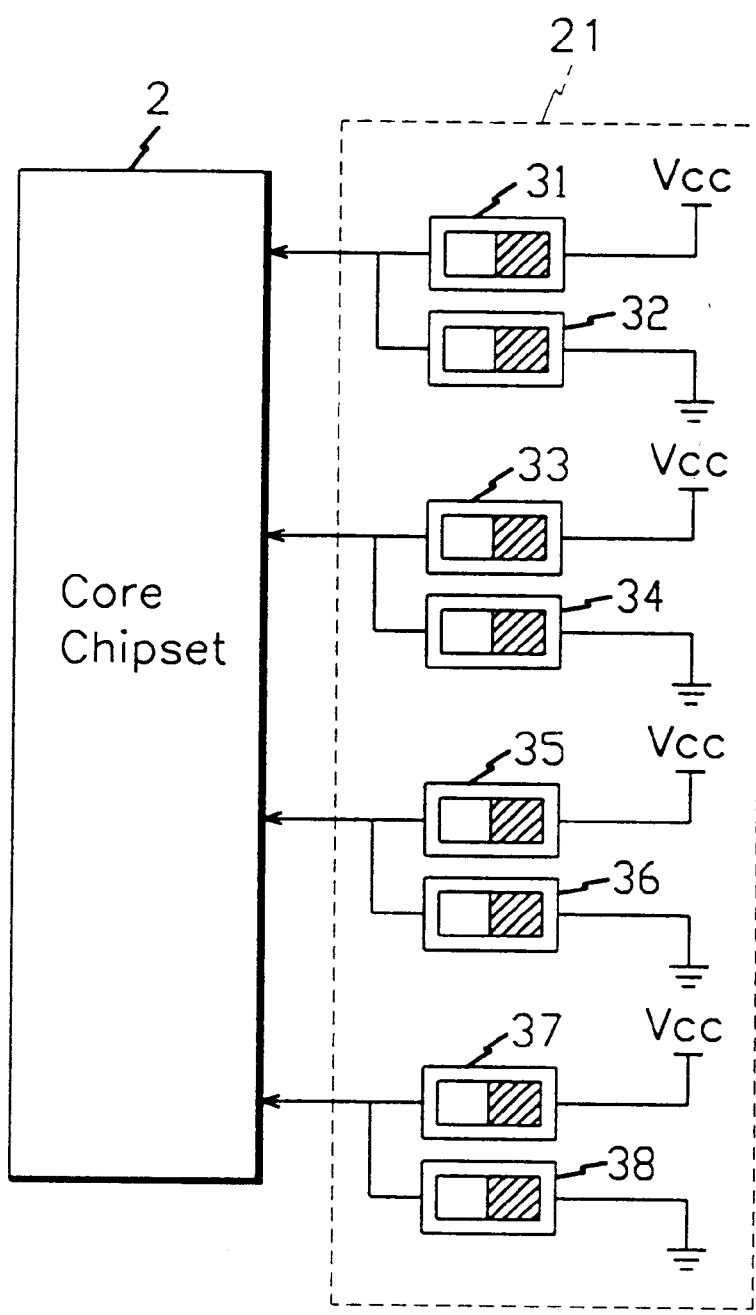
FIG. 3 illustrates a setting block of the computer system using a common BIOS according to a second embodiment of the present invention.
Figure 4:
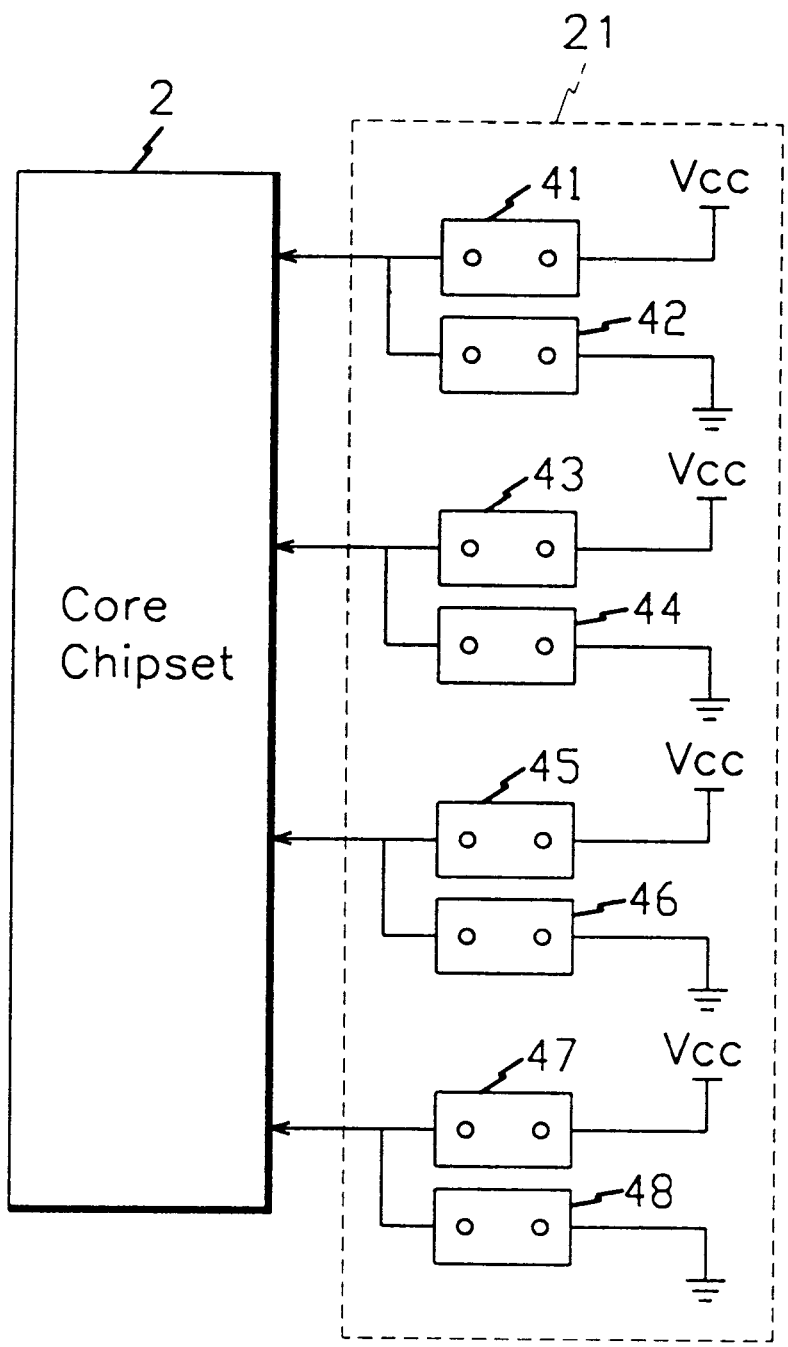
FIG. 4 illustrates a setting block of the computer system using a common BIOS according to a third embodiment of the present invention.
Figure 5:
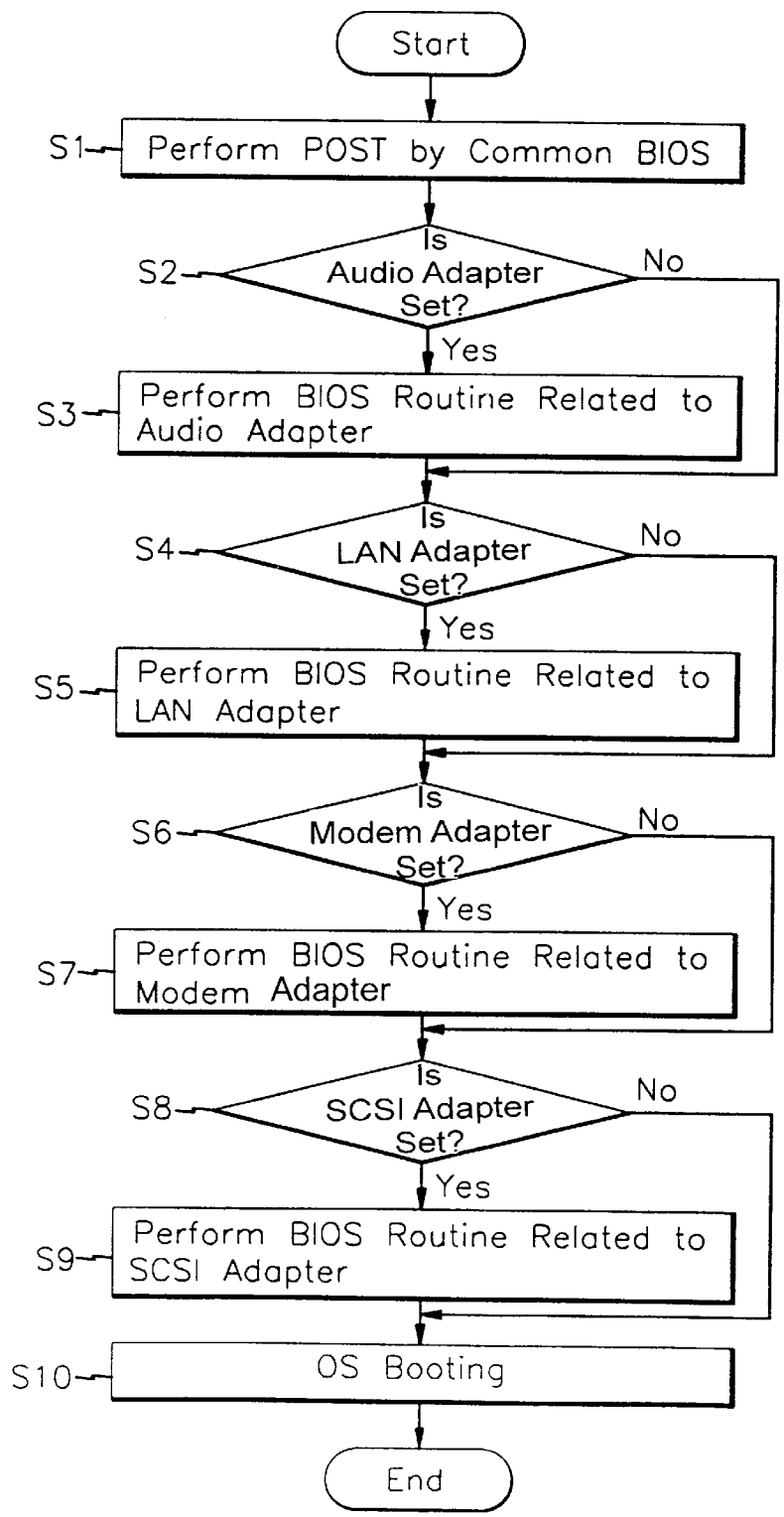
FIG. 5 is a flow chart of a method for controlling a computer system using a common BIOS according to the preferred embodiment of the present invention.

FIG. 3 illustrates a setting block 21 of the computer system using a common BIOS according to a second embodiment of the present invention. As shown in FIG. 3, the setting block 21 may be constructed of a series of dip switches 31 to 38 connected in parallel to the core chipset 2 which collectively serve to determine whether each of the expansion adapters 13 to 16 is mounted in the expansion adapter function block 12 of the computer. Likewise, FIG. 4 illustrates a setting block of the computer system using a common BIOS according to a third embodiment of the present invention. In this situation, the setting block 21 is constructed of a series of jumpers connected in parallel to the core chipset 2.

Now, the operation of the computer system using a common BIOS and a control method thereof according to the preferred embodiment of the present invention will be described in detail with reference to FIGS. 1 to 5 hereinbelow.

Once a computer manufacturer or a user sets information about whether the adapters are set in the expansion adapter function block 12, using the setting block 21, and the common BIOS enables a normal routine about all the adapters 13 to 16 in the expansion adapter function block 12. When power is applied to the computer by the user, the operation of the computer for using a common BIOS according to the preferred embodiment of the present invention is started. When operation is started, a common BIOS program in the flash ROM 4 is read to the memory 3 through the core chipset 2, and the CPU 1 enables the common BIOS routine.

The CPU 1 performs a POST procedure through the common BIOS routine at step S1, and receives the signal GPI1 informing whether the audio adapter 13 is mounted in the expansion adapter function block 12 from the first resistor R1 or the second resistor R2 in the setting block 21 through a GPI (General Purpose Input) port in the core chipset 2 and determines whether the audio adapter 13 is mounted in the expansion adapter function block 12 at step S2. Here, the signal GPI1 of the high level is output if the first resistor R1 is connected, and it indicates that the audio adapter 13 is set. If the second resistor R2 is connected, the signal GPI1 of a low level is output and it indicates that the audio adapter 13 is not set.

The CPU 1 determines that the audio adapter 13 is mounted in the expansion adapter function block 12 and enables the BIOS routine related to the audio adapter 13 if the audio adapter 13 is set in the setting block 21 by the first resistor R1 at step S3. The CPU 1 disables the BIOS routine related to the audio adapter 13 if the signal GPI1 of the low level is output.

Next, the CPU 1 receives the signal GPI2 informing whether the LAN adapter 14 is mounted in the expansion adapter function block 12 from the third resistor R3 or the fourth resistor R4 in the setting block 21 through the core chipset and determines whether the LAN adapter 14 is mounted in the expansion adapter function block 12 at step S4. The CPU 1 determines that the LAN adapter 14 is mounted in the expansion adapter function block 12 and enables the BIOS routine related to the LAN adapter 14 if the signal GPI2 of the high level is output at step S5. The CPU 1 disables the BIOS routine related to the LAN adapter 14 if the signal GPI2 of the low level is output.

The CPU 1 receives the signal GPI3 informing whether the modem adapter 15 is mounted in the expansion adapter function block 12 from the fifth resistor R5 or the sixth resistor R6 in the setting block 21 through the GPI port in the core chipset 2 and determines whether the modem adapter 15 is mounted in the expansion adapter function block 12 at step S6.

The CPU 1 determines that the modem adapter 15 is mounted in the expansion adapter function block 12 and enables the BIOS routine related to the modem adapter 15 if the signal GPI3 of the high level is output at step S7. The CPU 1 disables the BIOS routine related to the modem adapter 15 if the signal GPI2 of the low level is output.

The CPU 1 receives the signal GPI4 informing whether the SCSI adapter 16 is mounted in the expansion adapter function block 12 from the seventh resistor R7 or the eighth resistor R8 in the setting block 21 through the GPI port in the core chipset 2 and determines whether the SCSI adapter 16 is mounted in the expansion adapter function block 12 at step S8. The CPU 1 determines that the SCSI adapter 16 is mounted in the expansion adapter function block 12 and enables the BIOS routine related to the SCSI adapter 16 if the signal GPI4 of the high level is output at step S9. The CPU 1 disables the BIOS routine related to the SCSI adapter 16 if the signal GPI4 of the low level is output. The CPU 1 performs an OS (Operating System) booting procedure at step S10, and the computer system is placed in a standby mode ready to receive the input by the user.

As previously described, the resistors R1 to R8 in the setting block 21 as shown in FIG. 2 may be substituted by dip switches 31 to 38 illustrated in FIG. 3 or jumpers 41 to 48 illustrated in FIG. 4, and all the operations remain the same. That is to say, the setting block 21 illustrated in FIG. 3 outputs the signals GPI1 to GPI4 informing that the expansion adapters 13 to 16 set by the dip switches 31, 33, 35 and 37 are set when the first dip switch 31, the third dip switch 33, the fifth dip switch 35 and the seventh switch 37 are turned ON. In addition, the setting block 21 illustrated in FIG. 3 outputs the signals informing that the expansion adapters 13 to 16 set by the dip switches 32, 34, 36 and 38 are not set when the second dip switch 32, the fourth dip switch 34, the sixth dip switch 36 and the eighth switch 38 are turned ON.

The setting block 21 includes the first dip switch 31 having one terminal connected to Vcc for outputting the signal GPI1 of the high level informing that the audio adapter 13 is set in the expansion adapter function block 12 to the core chipset 2 when the first dip switch 31 is turned ON; the second dip switch 32 having one terminal grounded and for outputting the signal GPI1 of the low level informing that the audio adapter 13 is not set in the expansion adapter function block 12 to the core chipset 2 when the second dip switch 32 is turned ON; the third dip switch 33, the fifth dip switch 35 and the seventh dip switch 37 having the same structure as the first dip switch 31; and the fourth dip switch 34, the sixth dip switch 36 and the eighth switch 38 having the same structure as the second dip switch 32.

As shown in FIG. 4, the setting block 21 includes a first jumper 41, a third jumper 43, a fifth jumper 45 and a seventh jumper 47 having one terminal connected to Vcc and the other terminal connected to the core chipset 2 respectively. When jumper lines are connected to the first jumper 41, the third jumper 43, the fifth jumper 45 and the seventh jumper 47, the signals GPI1 to GPI4 informing that the expansion adapters 13 to 16 set by the jumpers 41, 43, 45 and 47 are set, are outputted. In addition, the setting block 21 includes a second jumper 42, a fourth jumper 44, a sixth jumper 46 and an eighth jumper 48 having one terminal grounded and the other terminal connected to the core chipset 2. When jumper lines are connected to the second jumper 42, the fourth jumper 44, the sixth jumper 46 and the eighth jumper 48, the signals informing that the expansion adapters 13 to 16 set by the jumpers 41, 43, 45 and 47 are not set, are output.

The setting block 21 includes a first jumper 41 having one terminal connected to Vcc and the other terminal connected to the core chipset for outputting the signal GPI1 of the high level informing that the audio adapter 13 is set in the expansion adapter function block 12 when the jumper line is connected; a second jumper 42 having one terminal connected to Vcc and the other terminal connected to the core chipset for outputting the signal GPI1 of the low level informing that the audio adapter 13 is not set in the expansion adapter function block 12 when the jumper line is connected; a third jumper 43, a fifth jumper 46 and a seventh jumper 47 having the same structure as the first jumper 41; and a fourth jumper 44, a sixth jumper 46 and an eighth jumper 48 having the same structure as the second jumper 42.

In addition, resistors R1 to R8 (not shown) in the setting block 21 can be substituted by a push switch or other switches having the same function, and the number of adapters in the preferred embodiment of the present invention is four, but the number of adapters is not limited to this.

As described above, the present invention provides a computer for using a common BIOS program and a control method thereof according to the preferred embodiment of the present invention which can use the same BIOS for all kinds of computer systems by disabling the BIOS routine for the expansion adapter which is not mounted during the performance of the common BIOS routine after checking whether each expansion adapter is mounted, and does not need to change the BIOS even when the adapter is expanded. Since a common BIOS is used in conjunction with a motherboard of all computer systems, different BIOS routines for every motherboard in the computer systems can be avoided thereby saving cost.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A computer system using a common basis input/output system (BIOS) program for automatic operation with different expansion adapters, comprising:

a setting block for setting information of whether the expansion adapters are mounted in corresponding expansion slots of a motherboard;

a controller adapted for determining whether the expansion adapters are set in the corresponding expansion slots through signals from the setting block in order to automatically disable execution of a BIOS routine of any expansion adapter which is not set, and to automatically enable a BIOS routine related to any expansion adapter which is set, and a first means for automatically disabling execution of a BIOS routine of any expansion adapter which is not set and for automatically enabling a BIOS routine related to any expansion adapter which is set.

2. The computer system of claim 1, wherein said controller comprises:

a core chipset for sensing the setting of the setting block; and a central processing unit (CPU) for determining whether the expansion adapters are set through the core chipset in order to disable execution of a BIOS routine of any expansion adapter which is not set, and to enable execution of a BIOS routine related to any expansion adapter which is set;

said CPU adapted to provide a disable/enable signal to said first means and said first means adapted for responding to said disable/enable signal to disable execution of a BIOS routine of any expansion adapter which is not set, and to enable execution of a BIOS routine related to any expansion adapter which is set.

3. A computer system, comprising:

a memory storing an internal basic input/output system (BIOS) program and a control program;

an expansion adapter function block for connecting various expansion adapters to a system bus;

a setting block for setting corresponding information after determining that expansion adapters are mounted in the expansion adapter function block, and generating corresponding signals indicating whether the expansion adapter are respectively mounted in the expansion adapter function block;

a core chipset for receiving and generating data from and to a flash memory and the expansion adapter function block through said system bus, and automatically sensing the corresponding signals to determine whether the expansion adapters are set by said setting block; and a central processing unit (CPU) adapted for determining whether various expansion adapters mounted in the expansion adapter function block through the core chipset are set, disabling a BIOS program for the expansion adapter which is not set, and enabling a BIOS routine related to the set expansion adapter.

4. The computer system of claim 3, further comprising:

a first means for automatically disabling execution of a BIOS routine of any expansion adapter which is not set, and for automatically enabling a BIOS routine related to any expansion adapter which is set;

said CPU adapted to provide a disable/enable signal to said first means and said first means adapted for responding to said disable/enable signal to disable execution of a BIOS routine of the expansion adapter which is not set and to enable execution of a BIOS routine related to the expansion adapter which is set.

5. A method of using a common basic input/output system (BIOS) program for operation with a plurality of expansion adapters mountable on a motherboard of a computer system, said method comprising the steps of:

(1) automatically determining which ones of the plurality of expansion adapters are mounted on the motherboard of the computer system; and (2) automatically enabling the BIOS routines for the ones of the plurality of expansion adapters which are mounted in the computer system, and automatically disabling the BIOS routines for the ones of the plurality of expansion adapters which are not mounted in the computer system.

6. The method of claim 5, wherein said computer system comprises:

a memory for storing said common BIOS program;

said motherboard including an expansion adapter function block for connecting selected ones of the plurality of expansion adapters to a system bus;

a setting block for setting corresponding information after determining that selected ones of the plurality of expansion adapters are mounted in the expansion adapter function block, and generating corresponding signals indicating whether the selected ones of the plurality of expansion adapters are mounted in the expansion adapter function block;

a core chipset for receiving and generating data from and to the memory and the expansion adapter function block through said system bus, and sensing the corresponding signals to determine whether the selected ones of the plurality of expansion adapters are set by said setting block;

a central processing unit for determining which ones of the plurality of expansion adapters are mounted in the expansion adapter function block, and adapted for enabling the BIOS routines for the ones of the plurality of expansion adapters which are mounted in the expansion adapter function block while disabling the BIOS routines for the ones of the plurality of expansion adapters which are not mounted in the expansion adapter function block; and a first means for automatically disabling execution of a BIOS routine of any expansion adapter which is not set, and for automatically enabling a BIOS routine related to any expansion adapter which is set;

said CPU adapted to provide a disable/enable signal to said first means and said first means adapted for responding to said disable/enable signal to disable execution of a BIOS routine of any expansion adapter which is not set, and to enable execution of a BIOS routine related to any expansion adapter which is set.

7. A computer-readable medium or device for use with a computer system in which a BIOS program containing BIOS code utilized by a plurality of subsystems of the computer system is supplemented by a BIOS subroutine peculiar to a subset of the plurality of subsystems of the computer system, said medium or device being encoded with computer-readable code comprising code for:

automatically enabling the BIOS subroutine peculiar to a subset of the plurality of subsystems when a member of the subset is detected as present in an expansion slot of the computer system; and automatically disabling the BIOS subroutine peculiar to a subset of the plurality of subsystems when no member of the subset is detected as present in any expansion slot of the computer system.

8. The medium of claim 7 further comprising code for detecting whether a member of the subset is present in any expansion slot of the computer system.

* * * * *